United States Patent
Andersson

[11] Patent Number: 6,150,792
[45] Date of Patent: Nov. 21, 2000

[54] PHASE MONITOR

[76] Inventor: Hans Andersson, Gökvägen 7, S-133 36, Saltsjöbaden, Sweden

[21] Appl. No.: 09/254,189
[22] PCT Filed: Sep. 5, 1997
[86] PCT No.: PCT/SE97/01486
§ 371 Date: Mar. 2, 1999
§ 102(e) Date: Mar. 2, 1999
[87] PCT Pub. No.: WO98/10501
PCT Pub. Date: Mar. 12, 1998

[30] Foreign Application Priority Data

Sep. 6, 1996 [SE] Sweden .................................. 9603255

[51] Int. Cl.⁷ .................................. H02P 5/28; H02P 7/36
[52] U.S. Cl. .............................. 318/806; 361/23; 361/29; 361/33; 361/59; 361/86; 361/90
[58] Field of Search ................................. 18/806; 361/59, 361/75, 86, 90, 23, 28, 29, 33, 94

[56] References Cited

U.S. PATENT DOCUMENTS

| 4,333,050 | 6/1982 | Yeasting .................................. 324/107 |
| 4,879,625 | 11/1989 | Potenzone .................................. 361/90 |
| 4,999,730 | 3/1991 | Pickard . | |
| 5,097,379 | 3/1992 | Walton et al. . | |
| 5,319,514 | 6/1994 | Walsh et al. . | |
| 5,434,738 | 7/1995 | Kurszewski et al. ..................... 361/23 |
| 5,570,258 | 10/1996 | Manning .................................. 361/85 |
| 5,657,194 | 8/1997 | Waltz .................................. 361/75 |

*Primary Examiner*—David Martin
*Assistant Examiner*—Edgardo San Martin
*Attorney, Agent, or Firm*—Evenson, McKeown, Edwards & Lenahan, P.L.L.C.

[57] ABSTRACT

A phase monitor for a short-circuited asynchronous three-phase motor comprises a first and a second sensing unit, both of which are connected to a supply voltage line to the motor in order to sense the voltage conditions on the line, and a control switch which is controlled by the two sensing units and connected in a control circuit for a supply voltage switch for the motor, connected in the supply voltage line. When the supply voltage line is connected to a supply voltage source, the first sensing unit causes an immediate switching-on operation of the control circuit if the voltage conditions on the supply voltage line sensed by the first sensing unit at that moment are acceptable. After a switching-on operation of the control switch caused by the first sensing unit, the second sensing unit, which is operatively connected to the control switch via a delay unit, provides a delayed control of the state of the control switch in dependence upon the voltage conditions on the supply voltage line sensed by the second sensing unit.

4 Claims, 2 Drawing Sheets

PHASE MONITOR

BACKGROUND OF THE INVENTION

1. Field of the Invention

The present invention relates to a phase monitor for a short-circuited asynchronous three-phase motor.

2. Description of the Related Art

More particularly, the invention relates to such a phase monitor of the kind comprising sensing means, intended to be connected to a supply voltage line to the motor in order to sense the voltage conditions on said line, a control switch, controlled by said sensing means and intended to be connected in a control circuit for a supply voltage switch for the motor in order to close and open said control circuit in dependence upon the sensed voltage conditions on said line, said supply voltage switch being connected in the supply voltage line at a location between the connection point of said sensing means and the motor, and delay means for delaying the switching-on and switching-off operations of the control switch.

Such phase monitors are commonly utilized to prevent damages and injuries caused by phase-sequence faults or phase voltage drop-outs in the supply voltage to the motor. Normally, phase-sequence faults do not occur in permanent installations, since, in the case of such installations, once the motor has been installed and connected in a correct manner to a power distribution network, the phase sequence will normally not be altered. However, in the case of portable equipments, such as those connected to the mains via plug contacts, there is a high risk of phase-sequence faults. Phase voltage drop-outs, on the other hand, may occur to the same extent at permanent installations as at portable equipments.

The delay means contained in the phase monitor have for their purpose to prevent normal voltage variations on the mains from causing alternating switching-on and switching-off operations of the control switch and hence also of the supply voltage switch for the motor.

However, when using phase monitors of the above kind previously known, the delay of the switching-on operation has been found to cause a serious problem. Especially in the case of portable equipments, said delay may very well result in that, when, as a consequence of said delay, the motor does not start immediately upon a connection of the supply voltage line to the mains, an operator may shift the phase sequence of the voltage applied on the supply voltage line and then leave the motor connected to a supply voltage having an incorrect phase sequence. The invention has for its purpose to provide an improved phase monitor of the kind initially specified which avoids the risk of such serios mistakes made by an operator.

BRIEF SUMMARY OF THE INVENTION

The phase monitor, according to the invention proposed for said purpose, is primarily characterized in that said sensing means comprise, on the one hand, a first sensing unit which is operatively connected to the control switch without the intermediary of any delay means and which is arranged to cause an immediate switching-on operation of the control switch when the supply voltage line is connected to a supply voltage source, if the voltage conditions on the supply voltage line sensed by said first sensing unit at the connection moment are acceptable, and on the other hand, a sensing unit which is operatively connected to the control switch through the intermediary of said delay means and which is arranged, upon a preceding switching-on operation of the control switch caused by said first sensing unit, to cause a delayed control of the state of the control switch in dependence upon the voltage conditions on the supply voltage line sensed by said second sensing unit.

The invention guarantees that, when the supply voltage line is connected in a correct manner with respect to the phase sequence to a mains on which any phase voltage drop-out does not exist, the motor will start rotating in the correct direction almost immediately, while, after a switching-off operation of the control switch caused by a later phase voltage drop-out, it will not be restarted until correct voltages have again existed on all three phases during a time corresponding to the switching-on delay caused by said delay means.

In previously known phase monitors of the above kind, it has usually been necessary to make the switching-off delay shorter than the switching-on delay. However, according to the invention, the delay means may preferably be arranged to cause a substantially longer delay of a switching-off operation of the control switch caused by the second sensing unit than of a repeated switching-on operation of the control switch subsequently caused by this sensing unit. Such a function of the delay means is especially favourable if the mains to which the voltage supply line is connected is of inferior quality and highly sensitive to variations in its load.

The transfer of the control of the control switch from the first sensing unit to the second sensing unit after a switching-on operation of the control switch caused by the first sensing unit may be obtained in different ways. In order to facilitate said transfer of the control function, the second sensing unit may however suitably have a substantially higher sensitivity to any occurring variations in the amplitude of and the phase displacement between the phase voltages on the supply voltage line than does the first sensing unit have.

BRIEF DESCRIPTION OF THE DRAWINGS

Below, the invention will be described in further detail with reference to the accompanying drawings, in which.

DETAILED DESCRIPTION OF THE DRAWINGS

Figure 1:
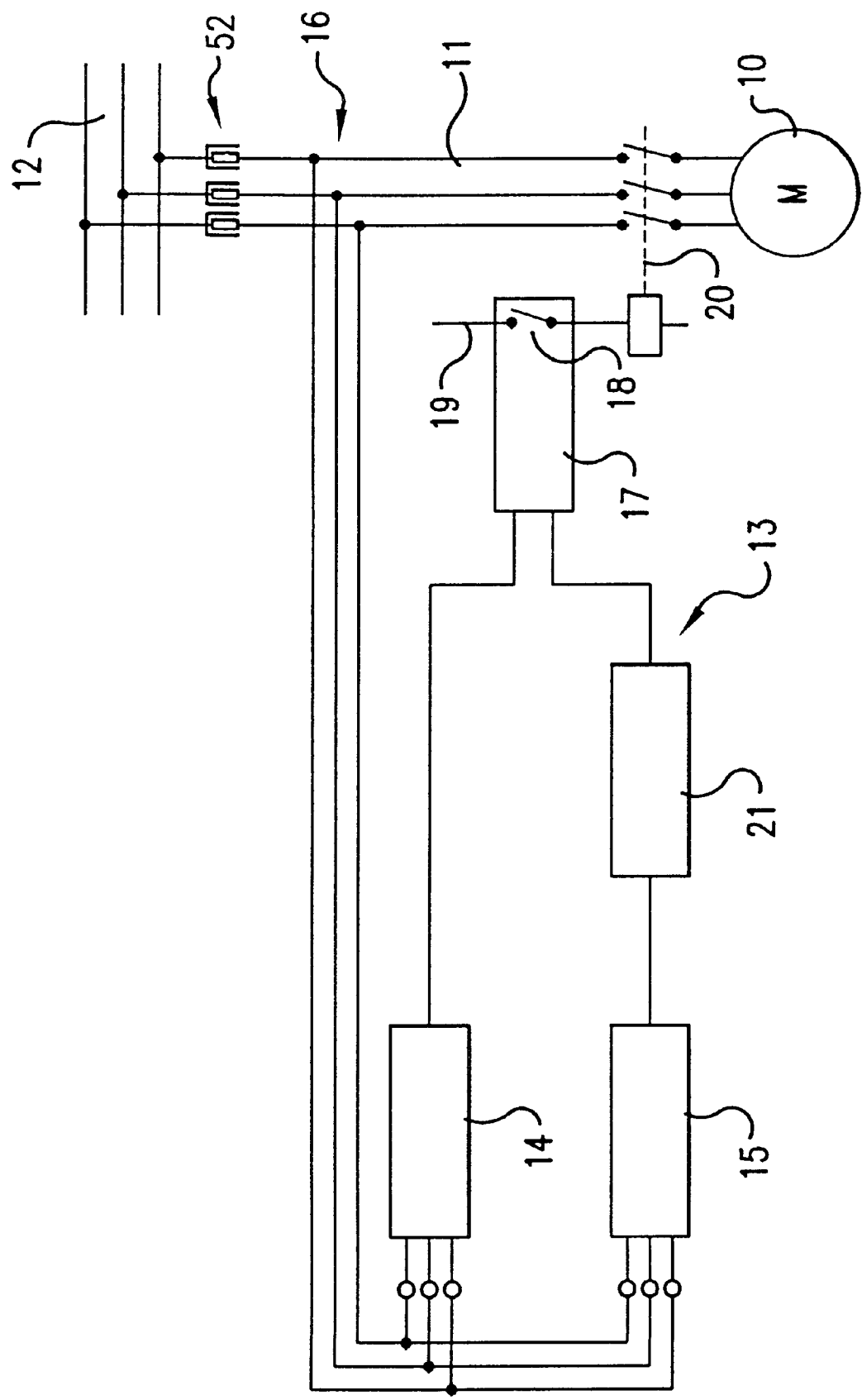
FIG. 1 shows a block diagram of a phase monitor according to an embodiment of the invention selected by way of example, illustrating the phase monitor connected to a supply voltage line to an electric three-phase motor.

In FIG. 1, reference numeral 10 designates an electric motor, consisting of a short-circuited asynchronous three-phase motor, and reference numeral 11 designates a supply voltage line to the motor through which the motor may be connected to a mains 12 in order to be supplied with the required supply voltage from said mains. FIG. 1 also shows a connector 52 serving to connect line 11 to mains 12 and consisting of a three-pole plug, connected to line 11, and a three-pole socket, connected to mains 12.

In order to prevent a phase-sequence fault caused by an incorrect connection of line 11 to mains 12 or a voltage drop-out on any of the three phases of mains 12 from causing any damages or accidents, there is provided a phase monitor generally designated 13. This phase monitor comprises a first sensing unit 14 and a second sensing unit 15 both of which are connected to line 11 at a point 16 in order to sense the voltage conditions on line 11 at said point. Furthermore, phase monitor 13 also comprises an output unit 17, containing a control switch 18 which is connected in a control circuit 19 (only partially shown) for a supply voltage switch 20 for the motor, connected in supply voltage line 11 at a location between the connection point 16 of the two sensing units and motor 10, and which serves to close and open control circuit 19 in dependence upon the sensed voltage conditions on line 11 at point 16. Finally, phase monitor 13 also comprises a delay unit 21, connected between the second sensing unit 15 and output unit 17. While sensing unit 15 thus is connected to output unit 17 via delay unit 21, sensing unit 14 is instead directly connected to output unit 17 without the intermediary of any delay unit.

Sensing unit 14 serves to sense the voltage conditions on line 11 at the moment when said line is connected to mains 12 and to cause an almost immediate switching-on operation of control switch 18 and hence also of supply voltage switch 20 if the voltage conditions on line 11 sensed at the connection moment are acceptable, i.e. if any phase-sequence fault or any phase voltage drop-out does not exist.

Sensing unit 15 instead serves to sense the voltage conditions on line 11 continuously once motor 10 has been connected to said line by a switching-on operation of the two switches 18 and 20 caused by sensing unit 14 and then to control the positions of said two switches in dependence upon the voltage conditions on line 11. If a phase voltage drop-out occurs when motor 10 is in operation, sensing unit 15 will cause a switching-off operation of switches 18 and 20 to occur after a predetermined time, determined by a switching-off delay caused by delay unit 21. Motor 10 will then be stopped. When the phase voltage interruption ceases, sensing unit 15 causes a repeated switching-on operation of switches 18 and 20 and a restart of motor 10 after another predetermined time, determined by a switching-on delay caused by delay unit 21.

In order to provide the functions above described, sensing units 14 and 15, output unit 17 and delay unit 21 may for instance be designed in the manner described below with reference to FIGS. 2, 3 and 4.

Figure 2:
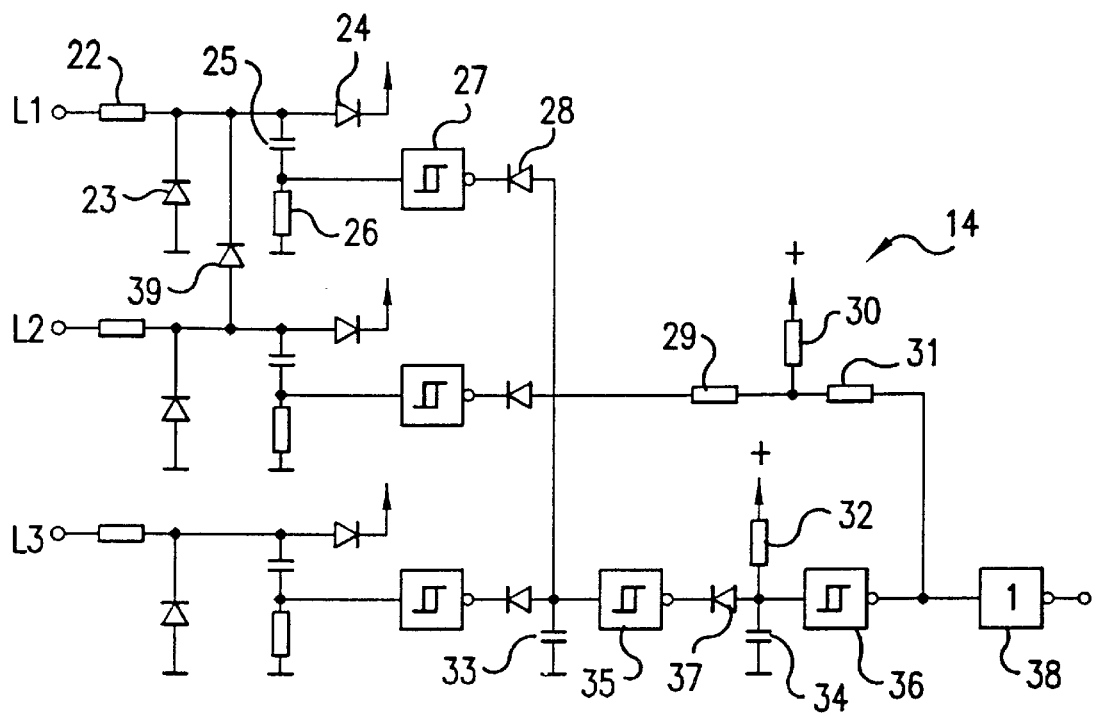
FIG. 2 shows a circuit diagram, illustrating one possible design of one of two sensing units contained in the phase monitor.

FIG. 2 shows a circuit diagram of a design of sensing unit 14, selected by way of example. In the illustrated case, unit 14 comprises three phase circuits which are intended to be connected each to one phase L1, L2 and L3, respectively, of line 11 and each of which consists of a resistor 22, a diode 23, a diode 24, a capacitor 25, a resistor 26, a Schmitt-trigger 27 having an inverted output, and a diode 28. Moreover, unit 14 also comprises a logic detector which is connected to diode 28 of each of the three star-connected phase circuits and which consists of four resistors 29, 30, 31 and 32, two capacitors 33 and 34, two Schmitt-trigger circuits 35 and 36 having inverted outputs, a diode 37 and an inverter 38.

The above-mentioned phase circuits 22–28 and the logic detector 29–38 connected thereto operate in the following manner. Capacitor 33 acts as an energy storage capacitor which is continuously charged in a positive direction via resistors 29 and 30 but which, if the three phase circuits are supplied with voltages from line 11 (FIG. 1) which are mutually displaced by about 120°, also continuously will receive negative pulses or discharge pulses from the phase circuits at sufficiently short intervals to make sure that the voltage across the capacitor will be maintained at a low level, corresponding to a logic "0". The output signal from the logic detector, i.e. the signal at the output of inverter 38, will then consist of a logic "1".

If as a consequence of a phase voltage drop-out on mains 12, any voltage does not exist on one of the phases of line 11, the corresponding phase circuit of unit 14 will not deliver any discharge pulse to capacitor 33. In this case, the two remaining discharge pulses cannot maintain the voltage across capacitor 33 on a low level, corresponding to a logic "0". Instead, said voltage will reach a higher level, corresponding to a logic "1". This means in its turn that the output signal from the logic detector will consist of a logic "0" and no longer of a logic "1".

In order to make it possible by means of unit 14 to detect not only any phase voltage drop-out existing on mains 12 at the moment of connecting line 11 to the mains but also any phase-sequence fault caused as a consequence of an incorrect connection of said line to the mains, unit 14 is also provided with a diode 39 which is connected between two of the phase circuits previously described. If a phase-sequence fault exists, said diode will eliminate the generation of discharge pulses in one of the phase circuits. The logic detector will therefor react on a phase-sequence fault in the same manner as on a phase voltage drop-out, i.e. the detector will deliver an output signal corresponding to a logic "0".

Sensing unit 15 may be built up in the same manner as sensing unit 14. Since any phase-sequence fault normally cannot occur once line 11 has been connected in a correct manner to mains 12, diode 39, shown in FIG. 2 and serving to detect such faults, may however be omitted in unit 15.

In order to make sure that sensing unit 15 will detect any phase voltage drop-out occurring during the operation of motor 10, it is necessary that this unit is highly sensitive to variations in the amplitude of and the phase displacement between the phase voltages occurring on line 11. The reason is that in the event of any drop-out of the voltage on one of the three phase conductors of line 11, motor 10 will supply said phase conductor with an induced voltage, the phase angle of which differs from the phase angle of the normal voltage on said phase conductor only by 10°–15° and the amplitude of which may be of the same order as the amplitude of the normal voltage on said phase conductor. Sensing unit 14 on the other hand may not have a corresponding high sensitivity as said unit is not intended to respond to any phase voltage drop-out occurring when the motor is in operation. Accordingly, unit 14 should have a substantially lower sensitivity to the amplitude and the phase angle of the phase voltages occurring on line 11 than does unit 15 have. This difference in voltage sensitivity between units 14 and 15 may be obtained by selecting the time constant for charging capacitor 33 differently for said two units.

Figure 3:
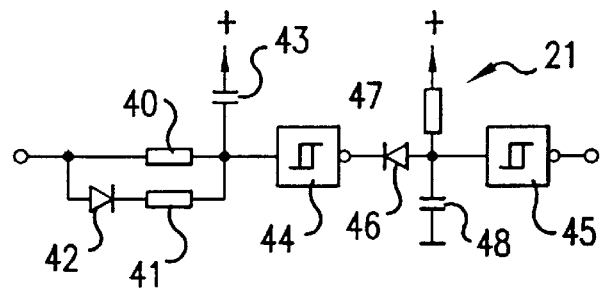
FIG. 3 shows a circuit diagram, illustrating one possible design of a delay unit contained in the phase monitor.

FIG. 3 shows a circuit diagram of a design of delay unit 21, selected by way of example. As previously mentioned, the input of said unit is connected to the output of sensing unit 15. In the illustrated case, unit 21 comprises two delay circuits which are connected in series. The first delay circuit is arranged to cause a predetermined switching-on and switching-off delay and consists of two resistors 40 and 41, a diode 42 and a capacitor 43. The second delay circuit consists of two Schmitt-trigger circuits 44 and 45, a diode 46, a resistor 47 and a capacitor 48 and it is arranged to cause a predetermined additional switching-off delay which preferably may be substantially longer than the switching-on and switching-off delay caused by the first delay circuit.

Figure 4:
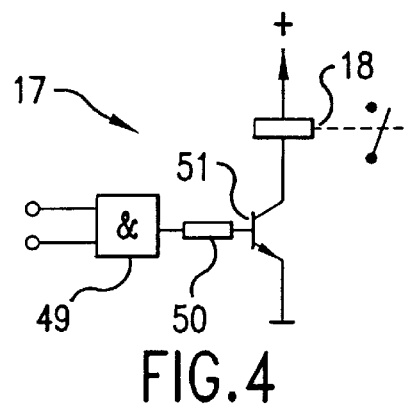
FIG. 4 shows a circuit diagram, illustrating one possible design of an output unit of the phase monitor.

FIG. 4 shows a circuit diagram of output unit 17. This unit consists of an AND-gate 49, a resistor 50, a transistor 51 and the previously mentioned control switch 18, intended to be connected in control circuit 19 (FIG. 1). One input of AND-gate 49 is connected to the output of sensing unit 14, while the other input of said gate is connected to the output of delay unit 21.

If, when connecting line 11 to mains 12, said line is connected to the mains in such a manner as to bring the different phase voltages to appear in correct phase sequence on line 11 and any phase voltage drop-out does not exist on the mains, AND-gate 49 will receive signals corresponding to a logic "1" from sensing unit 14 as well as from delay unit 21 which is such that it will always initially deliver an output signal corresponding to a logic "1". Transistor 51 will then cause a switching-on operation of control switch 18. If a phase-sequence fault exists, the input signal to AND-gate 49 from unit 14 will instead consist of a logic "0", which means that any switching-on operation of control switch 18 will not take place. In the same manner, any switching-on operation of switch 18 will neither occur if a phase voltage drop-out exists on mains 12 when line 11 is connected thereto.

The reason why delay unit 21 always initially generates an output signal consisting of a logic "1" at the time of connecting line 11 to mains 12 is that capacitor 48 then maintains the input of circuit 45 on a low level. The DC voltage supply to resistor 47 and to all other components connected to a positive DC voltage terminal is namely not started until said time by means of a DC voltage generating circuit (not shown), connected to one of diodes 24 (FIG. 2).

If a phase voltage drop-out occurs on line 11 while motor 10 is in operation, the low sensitivity of sensing unit 14 will result in that the output signal fed to AND-gate 49 from said unit will remain a logic "1". However, after the total switching-off delay determined by the two delay circuits in delay unit 21, the signal fed to AND-gate 49 from said unit will shift to a logic "0" and cause a switching-off operation of control switch 18. When, later on, the phase voltage in question returns, the output signal from delay unit 21 will shift back to a logic "1" and cause a renewed switching-on operation of control switch 18 after a time corresponding to the switching-on delay caused by said unit.

The invention is not restricted to the embodiment above described and shown in the drawings. Instead, many other embodiments are feasible within the scope of the invention as defined in the following claims.

What is claimed is:

1. Phase monitor for a short-circuited asynchronous three-phase motor, said phase monitor comprising a sensing system (14, 15), operably coupleable to a supply voltage line (11) for the motor (10) in order to sense voltage conditions on said line (11), a control switch (18), controlled by said sensing system (14, 15) and operably coupleable in a control circuit (19) for a supply voltage switch (20) for the motor (10) in order to close and open said control circuit (19) in dependence upon the sensed voltage conditions on said line (11), said supply voltage switch (20) being connected in the supply voltage line (11) at a location between a connection point (16) of said sensing system (14, 15) with said line (11) and the motor (10), and delay means (21) for delaying the switching-on and switching-off operations of the control switch (18), wherein said sensing system (14, 15) comprises:

(a) a first sensing unit (14) which is operatively connected to the control switch (18) without the intermediary of any delay means and which is arranged to cause an immediate switching-on operation of the control switch (18) when the supply voltage line (11) is connected to a supply voltage source (12), if the voltage conditions on the supply voltage line (11) sensed by said first sensing unit (14) at the connection moment are acceptable, and (b) a second sensing unit (15) which is operatively connected to the control switch (18) through the intermediary of said delay means (21) and which is arranged, upon a preceding switching-on operation of the control switch (18) caused by said first sensing unit (14), to cause a delayed control of the state of the control switch (18) in dependence upon the voltage conditions on the supply voltage line (11) sensed by said second sensing unit (15).

2. Phase monitor according to claim 1, wherein said delay means (21) are arranged to cause a substantially longer delay of a switching-off operation of the control switch (18) caused by the second sensing unit (15) than of a repeated switching-on operation of the control switch (18) subsequently caused by this sensing unit (15).

3. Phase monitor according to claim 1, wherein the second sensing unit (15) has a substantially higher sensitivity to any occurring variations in the amplitude of and the phase displacement between the phase voltages on the supply voltage line (11) than does the first sensing unit (14) have.

4. Phase monitor according to claim 2, wherein the second sensing unit (15) has a substantially higher sensitivity to any occurring variations in the amplitude of and the phase displacement between the phase voltages on the supply voltage line (11) than does the first sensing unit (14) have.

* * * * *